United States Patent
Mersmann et al.

(10) Patent No.: US 9,694,643 B2
(45) Date of Patent: *Jul. 4, 2017

(54) DEVICE FOR ADJUSTING THE HEIGHT OF A VEHICLE BODY

(71) Applicant: Schaeffler Technologies AG & Co. KG, Herzogenaurach (DE)

(72) Inventors: Simon Mersmann, Herzogenaurach (DE); Kilian Marsing, Hetzles (DE); Markus Holzberger, Emskirchen (DE); Hartmut Krehmer, Erlangen (DE); Jochen Rosenfeld, Erlangen (DE); Florin Dobre, Brasov (RO); Adrian Husu, Brasov (RO)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

This patent is subject to a terminal disclaimer.

(21) Appl. No.: 14/912,240

(22) PCT Filed: Aug. 5, 2014

(86) PCT No.: PCT/DE2014/200379
§ 371 (c)(1),
(2) Date: Feb. 16, 2016

(87) PCT Pub. No.: WO2015/021980
PCT Pub. Date: Feb. 19, 2015

(65) Prior Publication Data
US 2016/0221410 A1    Aug. 4, 2016

(30) Foreign Application Priority Data

Aug. 14, 2013 (DE) .................. 10 2013 013 467
Aug. 27, 2013 (DE) .................. 10 2013 216 969

(Continued)

(51) Int. Cl.
*B60G 17/00* (2006.01)
*B60G 17/015* (2006.01)
(Continued)

(52) U.S. Cl.
CPC ......... *B60G 17/00* (2013.01); *B60G 17/0157* (2013.01); *B60G 17/021* (2013.01);
(Continued)

(58) Field of Classification Search
CPC .. F16H 25/20; F16H 25/2015; F16H 25/2021; F16H 25/2204; F16H 25/2247;
(Continued)

(56) References Cited

U.S. PATENT DOCUMENTS 7,722,056 B2 * 5/2010 Inoue .................. B60G 15/063
280/5.512
7,784,373 B2 * 8/2010 Minbuta ............. F16H 25/2021
74/424.94

(Continued)

FOREIGN PATENT DOCUMENTS

DE    102010036238    3/2012
EP    1953013    8/2008
(Continued)

*Primary Examiner* — Laura Freedman
(74) *Attorney, Agent, or Firm* — Volpe and Koenig, P.C.

(57) ABSTRACT

A device (1) for adjusting the height of a vehicle body, including a movement thread (4) which is arranged between vehicle body and a wheel carrier and shifts two components (2, 3) which are displaceable in relation to each other between an upper and a lower adjustment position, wherein the movement thread (4) is provided with two threaded parts which are rotatable relative to each other, are formed from a spindle (7) and a spindle nut (3) and are in operative engagement with each other. The one threaded part is accommodated on one component in a manner fixed axially and rotationally driven by a rotary drive (6), and the other (Continued)

threaded part is accommodated on the other component non-rotatably and in an axially displaceable manner. In order to protect the movement thread (4), in particular the operative engagement, against high mechanical loads, a switchable locking device (18) spanning the operative engagement of the threaded parts (A, B) of the movement thread (4) is provided.

16 Claims, 7 Drawing Sheets

(30) Foreign Application Priority Data

Nov. 8, 2013 (DE) .................. 10 2013 222 729
Apr. 1, 2014 (DE) .................. 10 2014 206 142

(51) Int. Cl.
  *B60G 17/02* (2006.01)
  *F16H 25/20* (2006.01)
  *F16H 25/22* (2006.01)
(52) U.S. Cl.
  CPC ......... *F16H 25/20* (2013.01); *B60G 2202/42* (2013.01); *B60G 2204/44* (2013.01); *B60G 2204/4604* (2013.01); *B60G 2500/30* (2013.01); *F16H 25/2204* (2013.01); *F16H 2025/2087* (2013.01)
(58) Field of Classification Search
  CPC ............. F16H 25/2252; F16H 25/2285; F16H 2025/228; B60G 17/021; B60G 15/062; B60G 2202/312; B60G 2202/42; B60G 2202/442; B60G 2204/1242; B60G 2204/418; B60G 2204/419; B60G 2204/45; B60G 2204/4604; B60G 2204/62; B60G 2206/41; B60G 2500/30; B60G 17/00; B60G 17/0157; B60G 2204/44; F16F 9/56
  See application file for complete search history.

(56) References Cited

U.S. PATENT DOCUMENTS

| | | | | |
|---|---|---|---|---|
| 7,887,064 | B2* | 2/2011 | Inoue | B60G 11/27 280/5.5 |
| 8,103,408 | B2* | 1/2012 | Inoue | B60G 17/06 280/5.5 |
| 8,398,091 | B2* | 3/2013 | Inoue | B60G 17/0157 188/266.1 |
| 8,454,029 | B2* | 6/2013 | Michel | B60G 15/065 280/124.157 |
| 8,516,914 | B2* | 8/2013 | Osterlanger | B60G 7/006 188/129 |
| 8,943,916 | B2* | 2/2015 | Osterlaenger | B60G 7/006 192/223.4 |
| 2002/0089107 | A1* | 7/2002 | Koh | B60G 13/001 267/218 |
| 2007/0210539 | A1* | 9/2007 | Hakui | B60G 15/063 280/5.514 |
| 2008/0111334 | A1* | 5/2008 | Inoue | B60G 17/021 280/124.1 |
| 2008/0164111 | A1* | 7/2008 | Inoue | B60G 15/065 188/297 |
| 2009/0108546 | A1 | 4/2009 | Ohletz et al. | |
| 2010/0308518 | A1 | 12/2010 | Michel | |

FOREIGN PATENT DOCUMENTS

| | | | |
|---|---|---|---|
| EP | 2332756 | | 6/2011 |
| JP | 2011012785 A | * | 1/2011 |
| JP | 2011196507 A | * | 10/2011 |
| WO | 2013031623 | | 3/2013 |

* cited by examiner

DEVICE FOR ADJUSTING THE HEIGHT OF A VEHICLE BODY

FIELD OF THE INVENTION

The invention relates to a device for adjusting the height of a vehicle body including a movement thread that is arranged between the vehicle body and a wheel carrier and displaces two components that can be displaced relative to each other between an upper and a lower adjustment position, wherein the movement thread is provided with two threaded parts that can rotate relative to each other and are formed from a spindle and a spindle nut, wherein the one threaded part is held on one component in an axially fixed manner rotationally driven by a rotary drive and the other threaded part is held on the other component in a rotationally fixed and axially displaceable manner.

BACKGROUND

Devices according to the class for adjusting the height of vehicle bodies are provided, in particular, for increasing the ground clearance of motor vehicles or for lowering the bodies in the event of flat road surfaces, for example, for reducing the air resistance on the suspension struts, on a suspension strut bearing, or on a wheel carrier of the motor vehicles. In this way, for example, according to EP 2 332 756 A2, a height adjustment between a mounting of the suspension strut and an upper spring plate of a biased spring of the suspension strut or as known from EP 1 953 013 A2 between a component such as a sleeve part holding a wheel carrier and a lower spring plate. An actuation of such devices is performed, for example, by means of an electric motor that rotationally drives a movement thread, for example, a spindle drive or ball screw, so that, from the rotational movement, for example, of a rotationally fixed and axially displaceable spindle and a resulting rotationally driven, axially fixed spindle nut, an axial displacement of a fixed component is realized relative to a component of the suspension strut displaceable axially relative to this part and thus an essentially continuous height adjustment of the suspension strut and thus the vehicle body with a corresponding setting of the ground clearance between an upper and a lower adjustment position is achieved. Here, shocks applied to the wheel mounted on the suspension strut have a negative effect on the movement thread, in particular, on the balls and their raceways of a ball screw.

SUMMARY

The object of the invention is the advantageous refinement of a device for adjusting the height of a vehicle whose movement thread is at least partially not subjected to the shocks.

The objective is achieved by one or more features of the invention.

The device provided is used for raising and lowering the vehicle body or for raising or lowering individual axles or the vehicle body, for example, a chassis, an underbody with corresponding superstructures and the like. For example, fuel savings can be achieved by reducing/optimizing the air resistance or the air flow around the vehicle if a speed-dependent level control is realized by lowering the vehicle body at high speeds and raising it at low speeds. Furthermore, load compensation or load help can be realized by raising the vehicle body, for example, a vehicle rear end in the event of heavy cargo or by lowering the body for a lighter loading of the vehicle. Furthermore, entering and exiting the vehicle can be made easier by raising or lowering the vehicle body. Cross-country mobility can be achieved by raising the vehicle for achieving a higher ground clearance. Improved road handling can be achieved by lowering the vehicle body. In connection with a corresponding control system, for example, a rolling or pitching control of the vehicle, rolling and pitching movements can be equalized or applied. For example, steadying of the vehicle body can be achieved in accordance with the sky-hook principle in that the devices arranged on all wheels are controlled individually by a preferred central control device and thus each individual wheel can be adapted (pro)actively to certain road surface stimulations.

It has proven to be advantageous from technical and economic reasons to provide a travel of 20 mm to 70 mm or more, preferably between 20 mm to 50 mm, between two adjustment positions. An adjustment speed between 5 mm/sec to 100 mm/sec, preferably between 5 mm/sec and 20 mm/sec, is advantageous between the two adjustment positions. A preferred installation position of the device is on the suspension struts of one or all axles of a vehicle. The movement thread is preferably provided coaxial to a shock absorber of the suspension strut. In this way, the movement thread can set the adjustment positions and thus the travel between a spring plate relative to a fixed component of the suspension strut. Alternatively, a travel above the upper spring plate can take place in the area of a suspension strut bearing on a vehicle body, for example, between the shock absorber tube and attachment to the vehicle body. Alternatively, the movement thread can be provided underneath the lower spring plate between the spring plate and wheel carrier, for example, between the wheel attachment and attachment of the spring-shock absorber unit.

The movement thread has, in one preferred embodiment, two threaded parts that are locked in rotation to each component and are arranged so that they can rotate one on the other. The threaded parts are in operative engagement with each other, that is, they support the axial forces acting against each other in the different displacement positions of the components to be set. The formation of the operative engagement can be formed directly between thread sections of the threaded parts or by means of rolling bodies rolling between these parts, for example, balls or rollers. Here, a threaded part is arranged locked in rotation and axially displaceable on the other component. The rotatable threaded part can be driven in both directions of rotation by a rotary drive, for example, an electric motor, in order to actuate the movement gear. Here, the threaded parts are formed preferably from a spindle and a spindle nut mounted rotatably on this spindle. Either the spindle or the spindle nut are rotationally driven, wherein the other threaded part—for a rotationally driven spindle, the spindle nut, or for a rotationally driven spindle nut, the spindle—has a rotationally locked and axially displaceable design and sets the axial displacement, such as the distance, between the two components between a lower and an upper adjustment position.

For protecting the movement thread, in particular, the axially loaded operative engagement between the threaded parts, the operative engagement between an upper and a lower adjustment position is mechanically bypassed in at least one case. Here, a switchable locking device can be provided that provides a switchable bypass of the operative engagement at the upper and/or lower adjustment position and/or at arbitrary positions in between. In an expanded sense, bypassing the movement thread refers to bypassing its operative engagement. For providing the locking device that is active between the upper and lower adjustment positions of the components, at least one, preferably two, three, or more switchable positive-fit connections are provided that mechanically bypass the operative engagement of the movement thread. In the simplest case, a positive-fit connection is provided at the upper adjustment position at a minimum distance of the components and a positive-fit connection is provided at the lower adjustment position at a maximum distance of the components to each other. In one especially advantageous design of the device, there is at least one free wheel that is switchable between these axial extreme positions, in order to achieve, for example, for different load states and the like, while bypassing the movement thread setting the corresponding distance between the two components, a positive-fit connection of the two components in sufficient height adaptation.

According to one advantageous embodiment, at least one switchable positive-fit connection is formed by a locking device that switches as a function of an axial displacement of the components relative to each other according to the ballpoint pen principle.

Here, the locking device contains, for example, a locking ring mounted on the spindle in a rotating and axially fixed manner with locking cams arranged distributed over the circumference. In collaboration with these cams, rising switching ramps that are formed on the spindle nut, for example, made from a ramp ring, and distributed over the circumference and longitudinal grooves distributed over the circumference and in which the locking cams of the locking ring are guided are axially supported. Axially supported is to be understood in that the longitudinal grooves and the switching ramps are axially supported on the spindle nut by means of a force that is active between the components, for example, the force of gravity that is active between the vehicle body and a wheel carrier. For a stationary spindle nut and a rotationally driven spindle, switching ramps and longitudinal grooves can be connected rigidly to the spindle nut, while for a rotationally driven spindle nut, the longitudinal grooves and switching ramps are arranged rotationally decoupled relative to these parts, that is, rotationally locked relative to a housing holding the spindle nut so that it can rotate. In one preferred embodiment with a rotating spindle nut held axially fixed in a housing and driven by a rotary drive, axially supported means a fixed arrangement of the longitudinal grooves and switching ramps in the housing, wherein, for rotational driving of the spindle nut, the entire housing is lifted and lowered relative to the spindle. Here, the spindle is fixed to a first component or forms this component and the housing forms the second component or is fixed to this component.

Here, between the spindle nut and the spindle there are axial positive-fit connections by means of locking recesses and longitudinal grooves, in that the locking cams of the locking ring are held in the longitudinal grooves so that they can be displaced along a displacement path of the movement thread and form a positive-fit connection in the event of contacting the locking recesses.

In one preferred embodiment, a guide sleeve having the longitudinal grooves is axially supported on the spindle nut. For a rotationally driven spindle, the guide sleeve can be connected rigidly to the spindle nut, for example, welded, swaged, and/or latched, while for a rotationally driven spindle nut, the guide sleeve is preferably rotationally decoupled and axially supported on this part, for example, by means of an axial bearing. The guide sleeve has longitudinal grooves over its circumference and locking recesses that are formed, for example, molded or cut from the sleeve as longitudinal slots, preferably off-tool, for example, in a guide sleeve produced from sheet metal. Here, the longitudinal slots are also to be understood explicitly as longitudinal grooves.

The longitudinal grooves advantageously form groups each with preferably three different lengths over the circumference that are axially limited by the locking recesses. For an axial displacement of the axially displaceable threaded part, the locking cams are preferably guided in the longest longitudinal groove. A storage of the locking cams here takes place in the upper adjustment position on the locking recesses of these longitudinal grooves for forming a first axial positive-fit connection. If the locking cams sheer out from the longitudinal grooves, the locking ring rotates when the locking cams approach the switching ramps, so that the locking cams are oriented toward a group of shorter longitudinal grooves. If the rotational direction of the rotary drive reverses, the locking cams sheer into the shorter longitudinal grooves and contact the associated locking recesses accordingly with shortened displacement travels and form with these for shortened distances relative to the upper adjustment position. Depending on the switching, that is, rotation of the locking ring on the switching ramp positions, the locking cams form the axial positive-fit connection, for example, at the lower adjustment position, at the upper adjustment position, or at least an axial adjustment position in between. Depending on the number of groups of longitudinal grooves of different lengths, a corresponding number, for example, two to six, preferably three different axial adjustment positions can be provided with the positive-fit connections bypassing the movement thread. In the lower adjustment position, a formation of longitudinal grooves can be negligibly short, so that these are practically eliminated.

The positioning of the locking cams on the longitudinal grooves of a desired locking position is realized by a corresponding number of switching processes between the locking cams and the switching ramps. The total switching process here takes place in a first rotational direction of the rotating threaded part through sheering out of the locking cams from the current longitudinal grooves, approach of the locking cams to the switching ramps, rotation of the locking ring through sliding of the locking cams along the ramp rises of the switching ramps, setting to the next adjustment position in the circumferential direction through contact on the circumferential stops of the switching ramps, reversal of the rotational direction of the rotary drive, and sheering in of the locking cams into the next group of longitudinal grooves in the circumferential direction. To enable further switching of the locking cams relative to the longitudinal grooves, the stops, such as circumferential stops, are offset relative to a central axis, such as longitudinal axis, of the longitudinal grooves in the circumferential direction and the inputs of the longitudinal grooves and the locking cams have insertion bevels that are complementary to each other, so that when the locking cams sheer into the longitudinal grooves by means of these insertion bevels, the locking ring is rotated slightly, that is, with a smaller extent than a ramp length of the switching ramps in the circumferential direction. Therefore, the locking cams appear for new sheering out from the longitudinal grooves in the next switching process back at rises of the switching ramps and not directly at stops of the switching ramps, like would be the case if there were no rotation.

If the locking cams sheer into a different group of longitudinal grooves, the switching process is repeated a corresponding number of times. Reversal of the rotational direction of the rotary drive is to be understood here preferably both as a pole reversal of an electric motor provided as a rotary drive and as a switching of the rotational sense in a switchable transmission between the rotary drive and rotationally driven thread part.

A positive-fit connection formed between locking cams and locking recesses is disconnected again by reversing the rotational direction of the rotary drive and displacing the locking cams in the corresponding longitudinal grooves or sheering them out of these grooves for introducing another switching process.

In this way, the locking device can have multiple-step, switchable positive-fit connections between the adjustment positions each with a step-shaped locking ring arranged actively over the circumference, switching ramps, and a guide sleeve. Here, the movement thread can also be unloaded at adjustment positions between the upper and lower adjustment positions by switching a positive-fit connection.

In one advantageous embodiment for the rotationally driven spindle, it can be provided that the spindle nut is held by means of the guide sleeve rotationally locked on the first component, wherein radially inward extending tabs engage in longitudinal slots of a sleeve of the first component arranged radially within the movement thread, for example, a shock-absorber tube of a suspension strut or an additional sleeve. For a rotationally driven spindle nut, preferably a housing can be provided with the rigidly mounted rotary drive, guide sleeve, and switching ramps. The spindle nut is held in the housing in an axially fixed and rotating manner, for example, by means of an axial bearing and is driven by the rotary drive. Here, the housing forms the first component and can be rigidly connected to a wheel carrier, while the spindle is allocated to a spring plate of a suspension strut as the second component, for example, it can be mounted on this part. For a rotational drive of the spindle nut, this part rotates about the spindle, so that, depending on the rotational direction of the rotary drive, an axial displacement between the wheel carrier and spring plate is set for raising or lowering the vehicle body.

The drive, such as rotational drive of the rotationally driven threaded part, can be realized, for example, by means of a contact-commutated or brushless, electronically commutated direct current electric motor. Its rotor can be arranged axis parallel to the components and the rotationally driven threaded part can be driven by means of a belt or gearwheel drive.

The movement thread can be formed as a trapezoidal thread drive, planetary roller gear, or preferably as a ball screw. The rolling surfaces of a ball screw can be rolled, ground, turned, or formed in some other way.

The locking by the device provided can be monitored and optionally regulated, for example, by means of sensor monitoring, for example, for detecting rotational characteristic values, by means of electrical parameter of the electric motor or the like or can be realized through the simple movement against a stop for forming the positive-fit connection.

BRIEF DESCRIPTION OF THE DRAWINGS

The invention will be explained in more detail with reference to embodiments shown in FIGS. 1 to 10. Shown herein are.

DETAILED DESCRIPTION OF THE PREFERRED EMBODIMENTS

Figure 1:
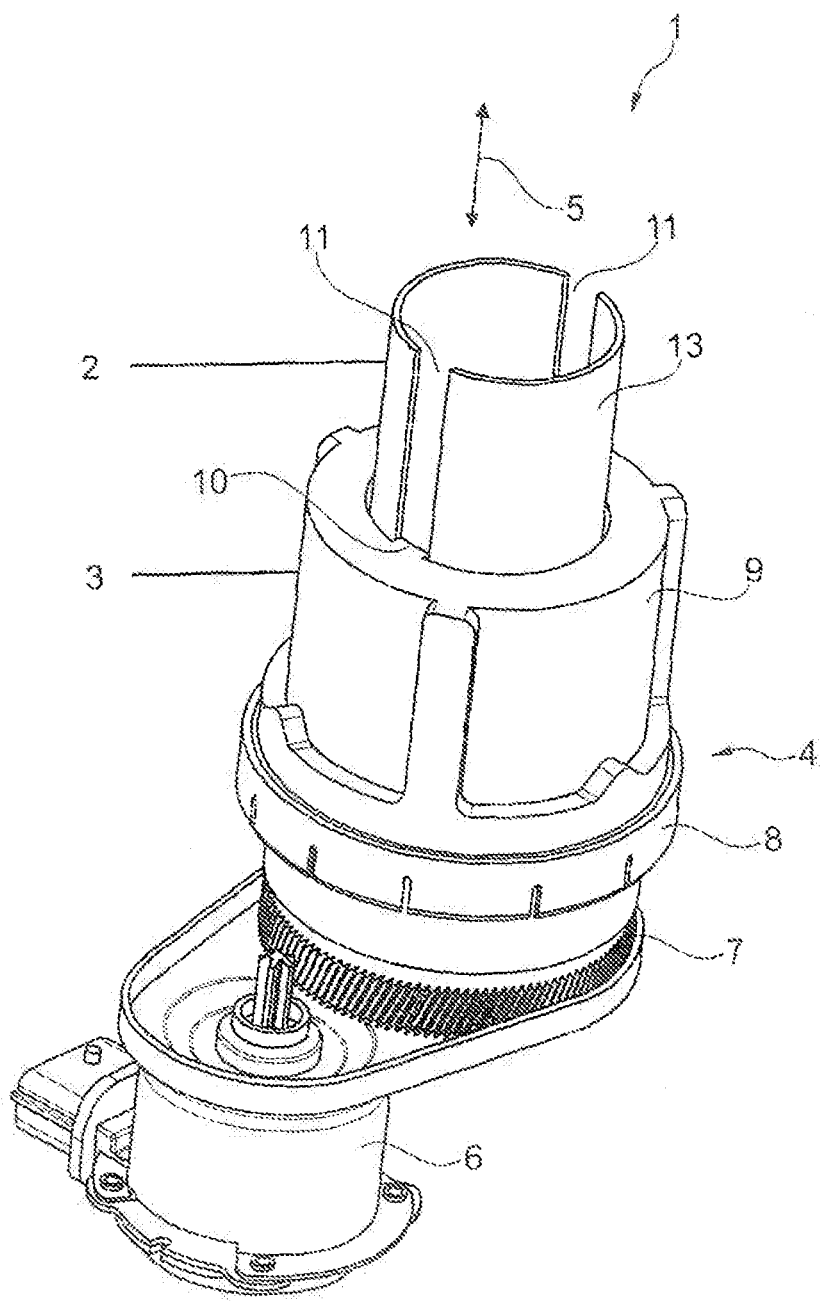
FIG. 1 a device with a device provided with a movement thread and a locking device, FIG. 2 the device of FIG. 1 in partial section, FIG. 3 an assembly of different modules of the device of FIGS. 1 and 2, FIG. 4 guide sleeve and locking ring of the device of FIGS. 1 to 4 at an upper adjustment position, FIG. 5 guide sleeve and locking ring of the device of FIGS. 1 to 4 at a lower adjustment position, FIG. 6 a comparison of the device in the lower and upper adjustment position in sectional representation, FIG. 7 a device with positive-fit connections arranged at three different adjustment positions in one view, FIG. 8 a comparison of the axial positions of the locking device of FIG. 7, FIG. 9 a device formed relative to the devices of the preceding figures with rotationally driven spindle nut in a sectioned 3-D view, and FIG. 10 the device of FIG. 9 in complete 3-D perspective with a view of the belt drive.

FIG. 1 shows the device 1 in one view with the movement thread 4—here a ball screw—arranged between a first, here only indicated component 2, for example, a shock-absorber tube of a suspension strut, and a second, also only indicated component 3, for example, a spring plate of a suspension strut. Depending on the embodiment, one component is allocated to the vehicle body and the other component is allocated to a wheel carrier of a wheel. The movement thread 4 displaces the two components 2, 3 relative to each other in the longitudinal direction of the double arrow 5. Here, the electric motor 6 drives the spindle 7 held on the first component 2 in an axially fixed and rotating manner for setting the displacement direction in an intended rotational direction by means of a not-shown belt or a gearwheel connection. On the spindle 7, the spindle nut 8 is held in a rotationally fixed and axially displaceable manner with the guide sleeve 9 held rigidly on this part. Here, the tabs 10 of the guide sleeve 9 engage in the longitudinal slots 11 of the sleeve 13 holding the spindle 7 so that it can rotate.

Figure 2:
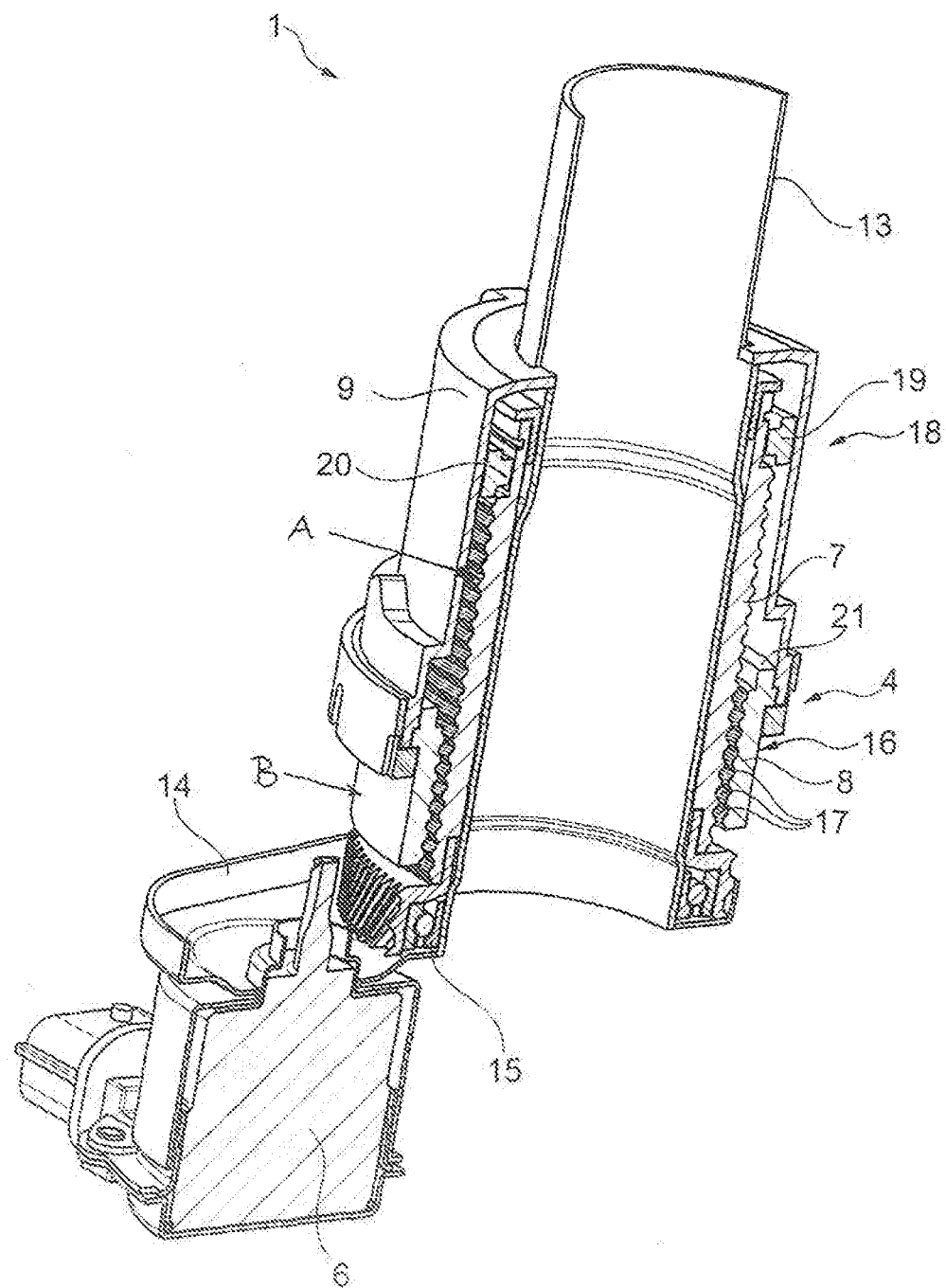

FIG. 2 shows the device 1 of FIG. 1 in a sectioned, 3-D view. The sleeve 13 is connected to the motor carrier 14 of the electric motor 6. The spindle 7 is held on the sleeve 13 by means of the rolling bearing 15 in an axially fixed and rotatable manner. When the spindle 7 is driven by the electric motor 6, this rotates and the spindle nut 8 is displaced axially as a function of the rotational direction of the electric motor 6.

In the illustrated embodiment, the movement thread 4 is formed as a ball screw 16 containing the threaded part A in the form of the spindle 7, the threaded part B in the form of the spindle nut 8, and the balls 17 rolling between these parts. Between the threaded parts A, B, the balls 17 take over the operative engagement. In order to protect this operative engagement of the movement thread 4 from loads at least in the upper adjustment position at maximum travel and in the lower adjustment position—shown here—without travel, the locking device 18 is provided. The locking device 18 is formed from the locking ring 19 held on the spindle 7 in a rotating and axially fixed manner with locking cams 20 distributed over the circumference and extended outward radially, the guide sleeve 9, and the ramp ring 21 arranged on the end face on the spindle nut 8.

Figure 3:
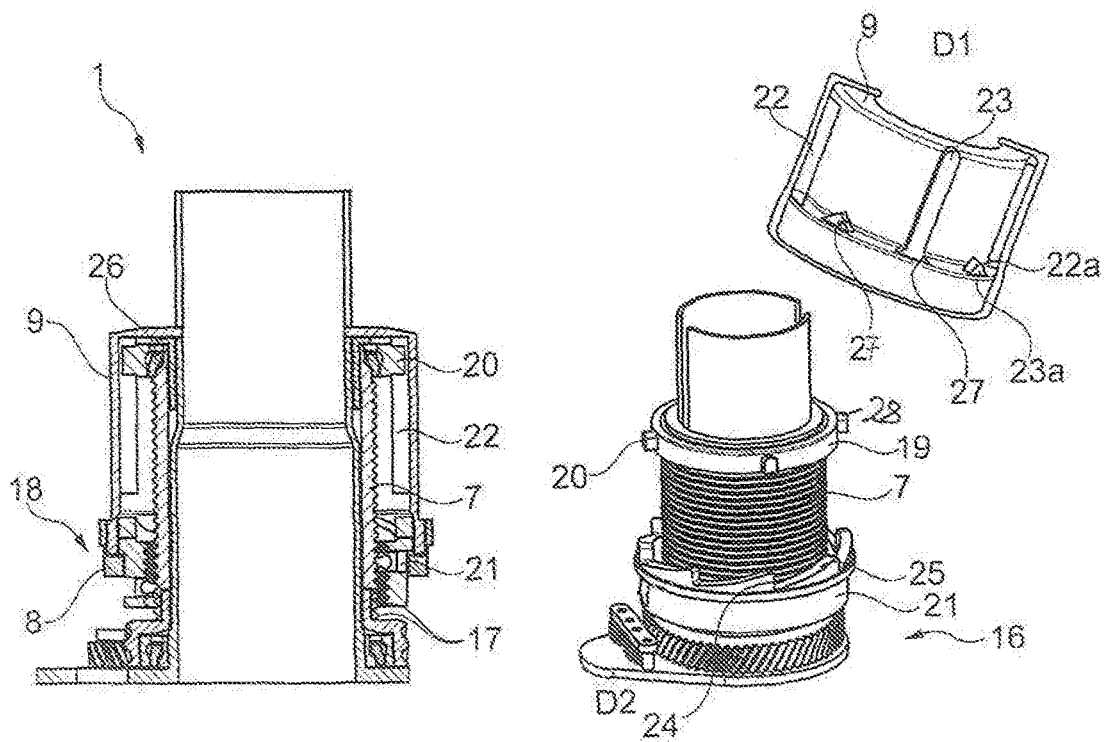

For explaining the function of the locking device 18, FIG. 3 shows the device 1 in section with the guide sleeve 9 shown in detail D1 and the ball screw 16 shown in detail D2. The guide sleeve 9 has long longitudinal grooves 22 that are molded or milled in the embodiment and distributed around the circumference and have the locking recesses 23 at their ends. The short longitudinal grooves 22a with the locking recesses 23a are provided alternating with the longitudinal grooves 22 over the circumference.

Figures 4, 5:
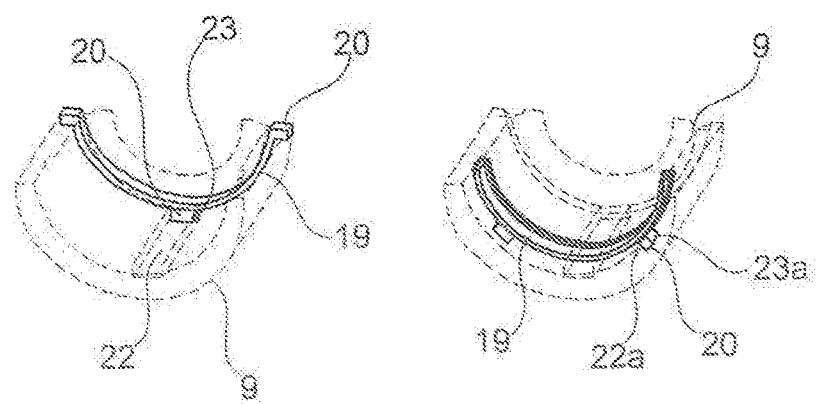

The switching ramps 25 held in the ramp ring 21 control, in interaction with the locking cams 20, what circumferential position is assumed by the locking cams 20 relative to the guide sleeve 9. The spindle nut 8 held on the spindle 7 has, on the ends, turned toward the locking ring 19, the ramp ring 21 with switching ramps 25 arranged rising with the circumference. The locking ring 19 that is held on the end on the spindle 7 by means of the rolling bearing 26 in an axially fixed and rotating manner has the radially outward extended locking cams 20 that align with the longitudinal grooves 22 or the longitudinal grooves 22a with respect to their distance in the circumferential direction. This produces the following function of the locking device 18 corresponding to a ballpoint pen principle:

At the beginning, at the lower adjustment position—as shown in FIG. 4—the locking cams 20 are in the longitudinal grooves 22 of the guide sleeve 9 on the locking recesses 23. In this way, according to FIG. 3, a first positive-fit connection is formed in the axial direction, so that, in the lower adjustment position, the spindle 7 is supported mechanically by means of the balls 17 relative to the spindle nut 8 while bypassing the rolling bearing. If the spindle 7 is rotated by the electric motor 6 (FIG. 1), the spindle nut 8 is displaced axially until the locking cams 20 come out of the longitudinal grooves 22 and contact the switching ramps 25 of the ramp ring. Here, the locking ring 19 is rotated based on the partitioning of the switching ramps 25 so that the locking cams 20 contact the stop 24 (FIG. 3) each at a stop 24 of a switching ramp 25 and thus are positioned at the opposite longitudinal grooves 22a with the locking recesses 23a. Due to the offset of the stops 24 relative to the longitudinal grooves 22, 22a, the locking ring 19 is rotated again when the locking cams 20 sheer into the longitudinal grooves 22, 22a by means of the insertion bevels 27, 28 on the longitudinal grooves 22, 22a and on the locking cams 20, so that only for a return of the locking cams 20 on the switching ramps 25, a new rotation along the switching ramps 25 on the stops 24 and thus a new switching process is made possible.

After a displacement of the spindle nut 8 through reversal of the rotational direction of the rotor of the electric motor 6 (FIG. 1)—as shown in FIG. 5—a mechanical, axial positive-fit connection is formed at the set upper adjustment position with bypassing of the rolling bearing of the ball screw 16 between the locking recesses 23a of the guide sleeve and thus of the spindle nut 8 and the locking cams 20 and thus by means of the locking ring 19 with the spindle 7. For a backward movement of the spindle nut 8, the locking cams 20 come out from the longitudinal grooves 22a again. A new stop on the switching ramps 25 of the ramp ring 21 rotates the locking ring 19 so that the locking cams 20 again align with the longitudinal grooves 22, so that the spindle nut 8 can be moved back in the direction of the lower adjustment position after a reversal of the rotational direction of the electric motor.

The control of the electric motor 6 (FIG. 1) takes place by means of corresponding sensors of rotational characteristic values, for example, rotations per minute, rotational angles, and the like, for the rotor of the electric motor, the spindle, and the like, and/or by evaluating the electrical parameters of the electric motor, for example, the operating voltage, the operating current, the required electrical power, and the like.

Figure 6:
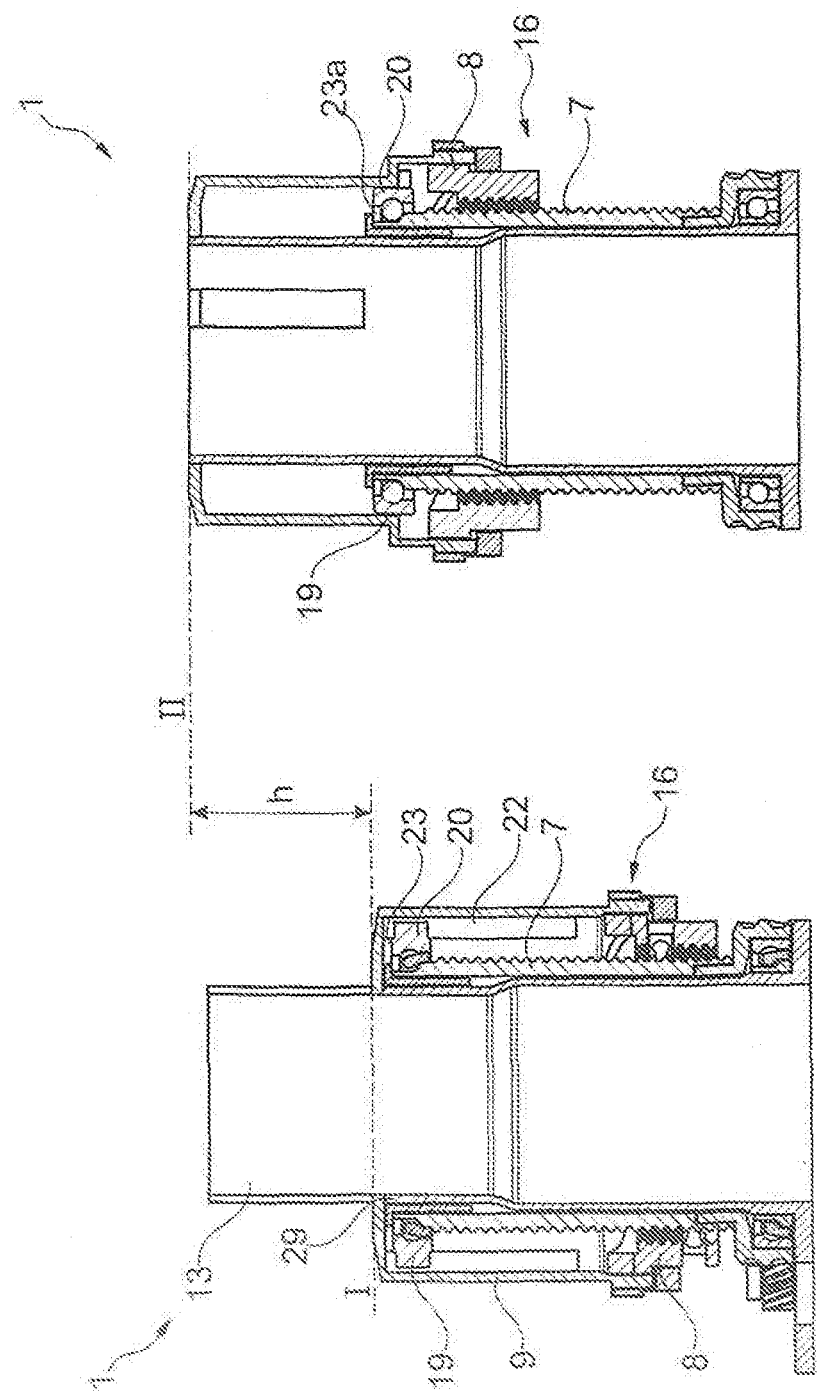

FIG. 6 shows the device 1 with the sleeve 29 arranged between the sleeve 13 and spindle 7, the guide sleeve 9, the locking ring 19 formed as an outer ring of an axial bearing with the locking cams 20, and the locking recesses 23 of the longitudinal grooves 22 in the lower adjustment position I (left) and in the upper adjustment position II (right) that define the travel h in the device 1. In the lower adjustment position I, the positive-fit connection is provided for bypassing the ball screw 16 between the locking recesses 23 and the locking cams 20 and thus between the spindle 7 and the spindle nut 8. In the upper adjustment position II, the positive-fit connection is provided for bypassing the ball screw 16 between the locking recesses 23a and the locking cams 20 of the locking ring 19 and thus also between the spindle nut 8 and spindle 7.

Figure 7:
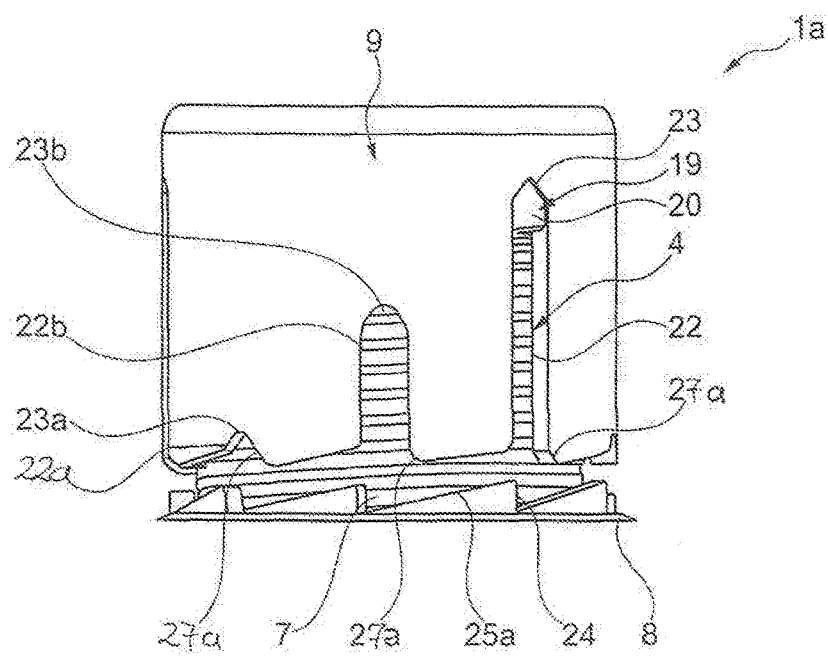

FIG. 7 shows a device 1a that has been changed relative to the device 1 of the previous figures and has, in contrast to the previous device, three adjustment positions bypassing the movement thread 4 by means of axially switchable positive-fit connections. Corresponding to the device 1, longitudinal grooves 22, 22a shown here as longitudinal slots with the locking recesses 23, 23a are provided in the guide sleeve 9, wherein these recesses hold, depending on the circumferential position, the locking cams 20 of the locking ring 19 and form, with these cams, an axial positive-fit connection at the upper or lower adjustment position. In the device 1a, in contrast to the device 1, additional longitudinal grooves 22b are provided with a length between the lengths of the longitudinal grooves 22, 22a and locking recesses 23b arranged on the ends. The longitudinal grooves 22, 22a, 22b are here arranged alternating around the circumference uniformly and the partitioning of the switching ramps 25a corresponds to the number of longitudinal grooves 22, 22a, 22b.

The selection like the switching of the longitudinal grooves 22, 22a, 22b and thus the selection of an axial stop position of the spindle nut 8 with the guide sleeve 9 relative to the spindle 7 is realized accordingly by the movement of the locking cams 20 against the switching ramps 25a. Here, initially by rotating the locking ring 19, the locking cams 20 are rotated against the stops 24 and thus oriented relative to the next longitudinal grooves—here from the longitudinal grooves 22 to the longitudinal grooves 22b. If the axial positive-fit connection with the locking recesses 23b of the longitudinal grooves 22b are set at approximately half the travel between the upper adjustment position at the locking recesses 23a and the lower adjustment position at the locking recesses 23, by means of reversing the rotational direction of the spindle 7, the locking cams 20 are moved against the locking recesses 23b. In contrast, if the longitudinal grooves 22a after the next grooves in the circumferential direction are selected and a positive-fit connection is created at the upper adjustment position, the switching process is repeated again. The orientation of the locking cams 20 to the switching ramps 25a following in the circumferential direction is realized by means of the insertion bevels 27a corresponding to the insertion bevels 27 described under FIG. 3 and interacting with the insertion bevels 28 of the locking cams 20. It is understood that for forming the positive-fit connection at the upper adjustment position by means of the locking recesses 23a, the longitudinal groove 22a has a very short construction or is completely eliminated.

Figure 8:
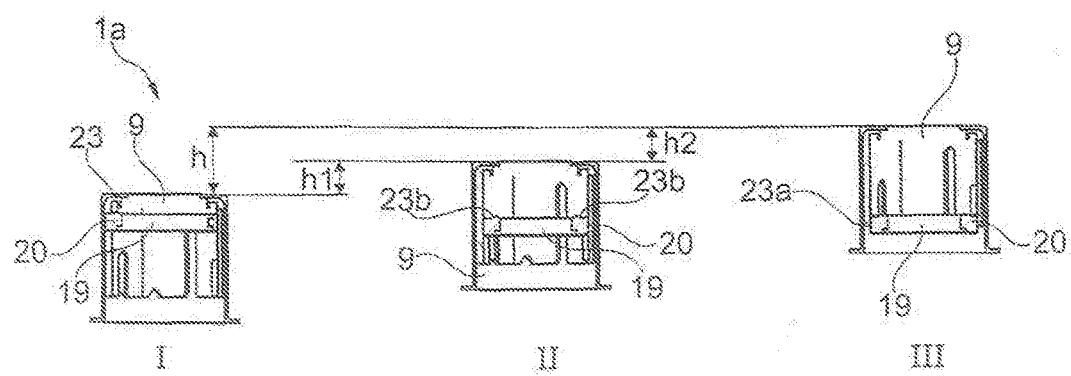

FIG. 8 shows the device 1a of FIG. 7 in the three adjustment positions I, II, III. In the lower adjustment position I, the adjustment between the guide sleeve 9 and spindle is minimal; the locking cams 20 of the locking ring 19 form, with the locking recesses 23, a first axial positive-fit connection. In the adjustment position III, the locking cams 20 of the locking ring 19 form, with a partial travel h1 of the spindle relative to the guide sleeve 9, a second axial positive-fit connection with the locking recesses 23b.

For further displacement of the guide sleeve 9 relative to the spindle by the partial travel h2 preferably corresponding to the partial travel h1, the adjustment position II displaced by the travel h relative to the lower adjustment position I is reached at which the locking recesses 23a form, with the locking cams 20 of the locking ring 19, a third axial positive-fit connection.

Figure 9:
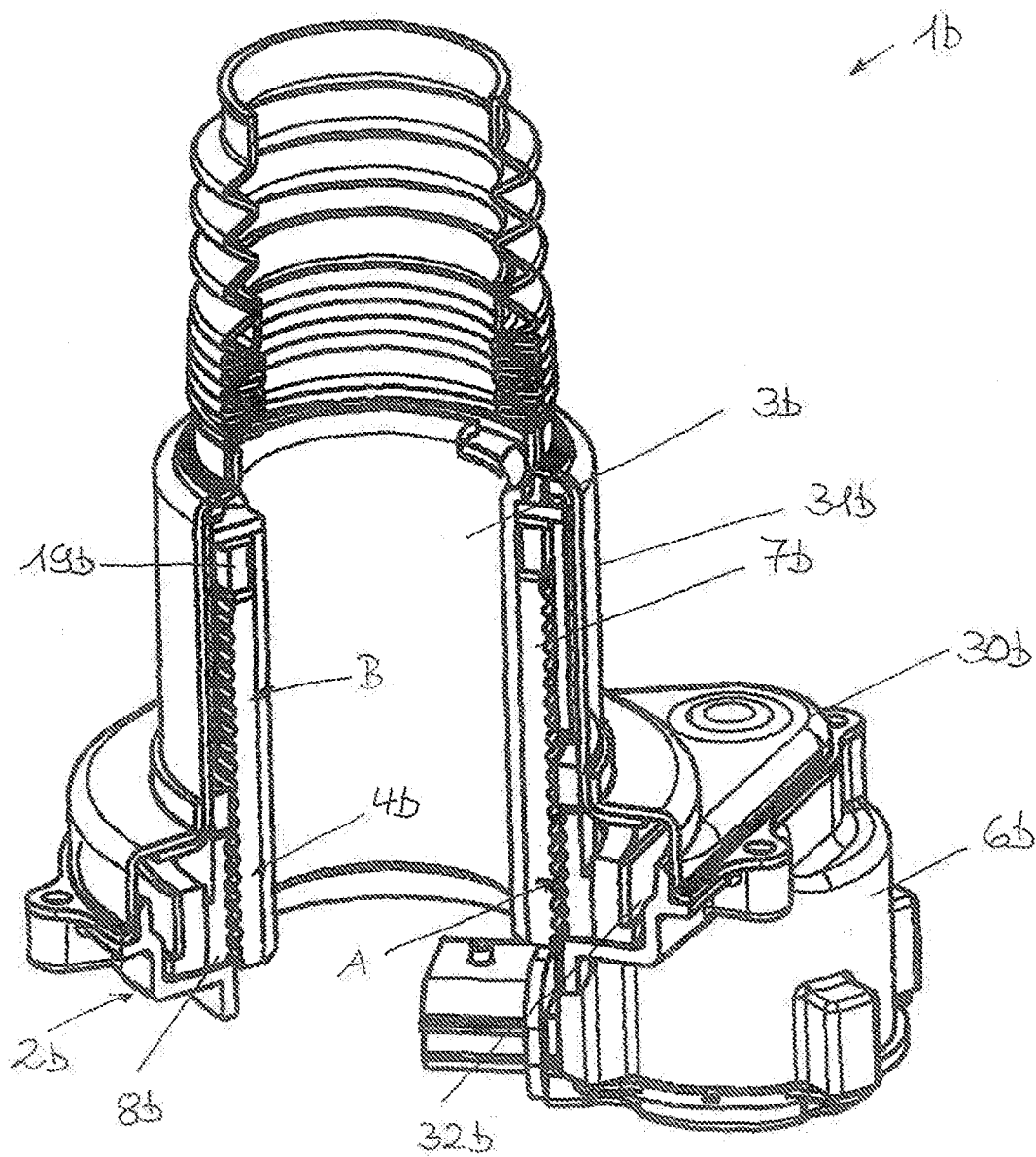

FIG. 9 shows the device 1b with the movement thread 4b arranged operatively between the components 2b, 3b. The movement thread 4b is formed from the threaded parts A, B that are formed in this embodiment relative to the movement thread 4 of FIGS. 1 to 8 in the form of the rotationally driven, axially fixed spindle nut 8b and the axially displaceable and rotationally fixed spindle 7b. Here, when the spindle nut 8b is rotationally driven by the rotary drive 6b, for example, an electric motor, the spindle 7b moves the two components 2b, 3b relative to each other.

The device 1b shown in the upper adjustment position for minimum displacement of the components 2b, 3b has the housing 30b allocated to the component 2b with the sleeve 31b. The housing 30b and thus the component 2b is connected, for example, to a wheel carrier or the like, while the spindle 7b is held rigidly on the component connected, for example, to a spring plate of a suspension spring. The spindle nut 8b is supported axially fixed in the housing 30b and rotatable by means of a not-visible rolling bearing. The spindle nut 8b is driven by means of the belt 32b arranged between the rotary drive 6b and the spindle nut 8b. In this way, depending on the rotational direction of the rotary drive 6b, the axial advance of the spindle 7b changes, so that a continuous displacement of the spindle 7b between the two adjustment positions can be realized.

Between the housing 30b and the component 3b, for activated rotary drive 6b, a specified distance is set by means of the movement thread 4b depending on its rotational direction, that is, the distance between the wheel carrier and suspension strut and thus the distance of the vehicle body to the road surface is increased or reduced.

Figure 10:
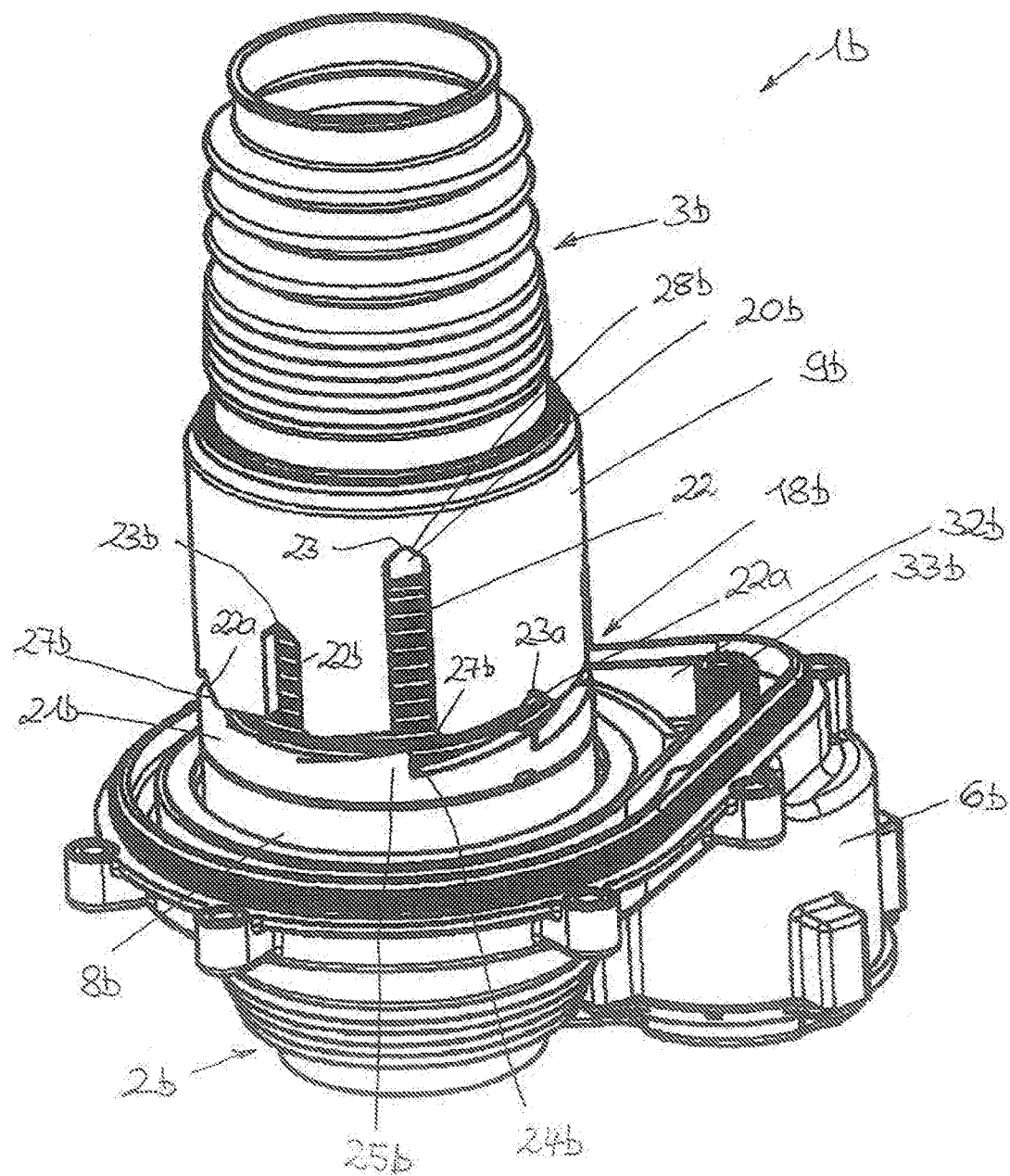

FIG. 10 shows the device 1b of FIG. 9 for a removed sleeve 31b (FIG. 9) with a view of the belt 32b arranged between the spindle nut 8b and the rotor 33b. In addition, the view of the, here, multi-step locking device 18b is released that is formed from the axially supported guide sleeve 9b that is connected rigidly to the housing 30b and rotatable relative to the spindle nut 8b and the ramp ring 21b spaced axially relative to the guide sleeve 9b and the locking ring 19b (FIG. 9) held rotatable and axially fixed on the spindle 7b with the locking cams 20b arranged distributed around the circumference. The axial support of the guide sleeve 9b and the ramp ring 19b relative to the spindle sleeve 9b is realized by means of the housing 30b with the sleeve 31b (FIG. 9). The locking cams 20b, for example, three locking cams 20b distributed around the circumference are moved along the longitudinal grooves 22, 22a, 22b according to the alignment of the locking ring 19b relative to the guide sleeve 9b until they contact the locking recesses 23, 23a, 23b. Here, the longitudinal groove 22a has a negligibly short construction, in order to achieve an axial positive-fit connection between the two components 2b, 3b at the lower adjustment position for maximum distanced components 2b, 3b and thus to bypass the operative engagement of the movement thread 4b (FIG. 9).

In the shown switch position, the locking cams 20b are in the longitudinal grooves 22 at the stop with the locking recesses 23 and thus form a positive-fit connection bypassing the movement thread 4b at the upper adjustment position for minimum displacement of the components 2b, 3b.

During a displacement of the two components 2b, 3b, the locking cams 20b are preferably in the longitudinal grooves 22, in order to be able to use the entire displacement travel between the components 2b, 3b. If this is not necessary, the locking cams 20b can also be guided in the longitudinal grooves 22b.

The switching between the longitudinal grooves 22, 22a, 22b with the locking recesses 23, 23a, 23b and thus a selection of the axial position of an axial positive-fit connection to be set is realized by rotating the locking ring 19b (FIG. 9) on the ramp ring 21b. Here, by rotating the spindle nut 8b, the locking cams 20b are moved against the switching ramps 25b of the ramp ring 21b. The profiles of the switching ramps 25b and locking cams 20b, which are complementary to each other, cause a rotation of the ramp ring 19b until the locking cams 20b contact the stops 24b between the switching ramps 25b. The stops 24b are positioned around the circumference so that, for a reversal of the rotational direction of the rotary drive 6b, the locking cams 20b are oriented to the next longitudinal grooves 22, 22a, 22b in the circumferential direction. Here, the insertion bevels 27b, 28b provide on the locking cams 20b and on the longitudinal grooves 22, 22a, 22b for sheering into the next longitudinal grooves 22, 22a, 22b by means of a partial rotation of the locking ring 19b that for a reverse displacement of the locking ring 19b, the locking cams 20b contact the next switching ramp 25b and a new rotation of the locking ring 19b with an orientation of the locking cam 20b on the next longitudinal grooves 22, 22a, 22b and thus locking recesses 23, 23a, 23b can be realized.

Through each displacement of the locking ring 19b, the next longitudinal grooves 22, 22a, 22b in the circumferential direction are controlled. This has the consequence, in the shown arrangement of the lengths of the longitudinal grooves 22, 22b, 22a long, medium, short in the circumferential direction that by means of a single switching of the locking ring 19b, switching from short to long, from long to medium, and from medium to short longitudinal grooves 22, 22a, 22b can be realized. If switching is to be performed from long to short, medium to long, or short to medium longitudinal grooves 22, 22a, 22b, two successive switching processes are required.

It is understood that the arrangement of the longitudinal grooves 22, 22a, 22b over the circumference of long, short, medium or short, medium, long could also be advantageous. In addition, the length of the longitudinal grooves 22, 22a, 22b could also be provided so that three positive-fit connections arranged axially at equal or different distances from each other are created.

LIST OF REFERENCE NUMBERS

1 Device
1a Device
1b Device
2 Component
2b Component
3 Component
3b Component
4 Movement thread
4b Movement thread
5 Double arrow 6 Rotary drive
6b Rotary drive
7 Spindle
7b Spindle
8 Spindle nut
8b Spindle nut
9 Guide sleeve
9b Guide sleeve
10 Tab
11 Longitudinal slot
13 Sleeve
14 Motor support
15 Rolling bearing
16 Ball screw
17 Ball
18 Locking device
18b Locking device
19 Locking ring
19b Locking ring
20 Locking cam
20b Locking cam
21 Ramp ring
21b Ramp ring
22 Longitudinal groove
22a Longitudinal groove
22b Longitudinal groove
23 Locking recess
23a Locking recess
23b Locking recess
24 Stop
24b Stop
25 Switching ramp
25a Switching ramp
25b Switching ramp
26 Rolling bearing
27 Insertion bevel
27a Insertion bevel
27b Insertion bevel
28 Insertion bevel
28b Insertion bevel
29 Sleeve
30b Housing
31b Sleeve
32b Belt
33b Rotor
I Lower adjustment position
II Upper adjustment position
III Middle adjustment position
A Threaded part
B Threaded part
D1 Detail
D2 Detail
h Travel
h1 Partial travel
h2 Partial travel

The invention claimed is:

1. A device for adjusting a height of a vehicle body comprising a movement thread that is arranged between the vehicle body and a wheel carrier and displaces two components that are displaceable relative to each other between an upper and a lower adjustment position (I, II), the movement thread includes first and second threaded parts (A, B) that rotate relative to each other and are in operative engagement with each other and are formed from a spindle and a spindle nut, the first threaded part (A) is held in an axially fixed manner and rotationally driven by a rotary drive on one of the components and the second threaded part (B) is held in a rotationally locked and axially displaceable manner on the other component, and a switchable locking device that bypasses an operative engagement between the threaded parts (A, B) of the movement thread, wherein the locking device includes a locking ring held on the spindle in a rotating and axially fixed manner with locking cams distributed over a circumference and extended radially outwardly.

2. The device according to claim 1, wherein the locking device comprises at least two switchable positive-fit connections that are spaced apart axially and mechanically bypass the movement thread between the components.

3. The device according to claim 2, wherein the locking device on the spindle nut comprises axially supported longitudinal grooves alternating around a circumference with locking recesses arranged at different axial heights, and the locking cams of the locking ring are held for rotation about the circumference and axially fixed on the spindle that are displaceable in the longitudinal grooves and axially spaced relative to the longitudinal grooves with rising switching ramps axially supported relative to the spindle nut and arranged distributed over the circumference in a number of the longitudinal grooves, and for the locking cams being movable out from the longitudinal grooves, the locking ring is rotated by a switching process of the locking cams on the switching ramps for axial contact of the locking cams on the switching ramps until the locking cams contact stops of the switching ramps and the locking cams move into the longitudinal grooves for a reversal of a rotational direction of the rotary drive and form axial positive-fit connections with the locking recesses arranged at a specified axial height in the longitudinal grooves.

4. The device according to claim 3, wherein at least two of the longitudinal grooves arranged distributed over the circumference are provided with the locking recesses arranged at the same axial height.

5. The device according to claim 3, wherein the stops are offset in the circumferential direction relative to a center axis of the longitudinal grooves and have insertion bevels that are complementary to the longitudinal grooves and the locking cams and cause a rotation of the locking ring.

6. The device according to claim 3, wherein the locking device has several of the locking recesses distributed over the circumference with switchable positive-fit connections formed in multiple steps in the axial direction.

7. The device according to claim 3, further comprising a guide sleeve that includes the longitudinal grooves that are molded or cut, with the longitudinal grooves being located at the different axial heights of the locking recesses, and the guide sleeve is connected axially supported to the spindle nut.

8. The device according to claim 7, wherein an axial positive-fit connection to the locking recesses without longitudinal grooves is provided.

9. The device according to claim 8, wherein the rotary drive is arranged fixed on one of the components axis-parallel to the components by a housing and rotationally drives the first threaded part (A) by a belt or gearwheel drive.

10. The device according to claim 9, wherein the spindle nut is rotationally driven.

11. The device according to claim 10, the guide sleeve and the switching ramps are supported axially fixed and rotatable relative to the spindle nut.

12. The device according to claim 1, wherein the spindle is rotationally driven.

13. The device according to claim 1, wherein the movement thread is formed as a trapezoidal thread drive, ball screw, or planetary roller gear drive.

14. The device according to claim 1, wherein the two components are provided in a suspension strut.

15. A level control comprising the device according to claim 1, and a central control unit that controls the device.

16. A device for adjusting a height of a vehicle body comprising a movement thread that is arranged between the vehicle body and a wheel carrier and displaces two components that are displaceable relative to each other between an upper and a lower adjustment position (I, II), the movement thread includes first and second threaded parts (A, B) that rotate relative to each other and are in operative engagement with each other and are formed from a spindle and a spindle nut, the first threaded part (A) is held in an axially fixed manner and rotationally driven by a rotary drive on one of the components and the second threaded part (B) is held in a rotationally locked and axially displaceable manner on the other component, and a switchable locking device that bypasses an operative engagement between the threaded parts (A, B) of the movement thread, wherein the switchable locking device has a locking ring that is supported on the spindle in a rotating and axially immovable manner, and forces acting between the two components are transmitted via the spindle and via the locking ring in at least one of the adjustment positions (I, II).

* * * * *